United States Patent [19]
Peschel

[11] 3,886,412
[45] May 27, 1975

[54] FLEXIBLE SNAKE-LIKE STRING OF COMPONENTS ENCASED IN TUBULAR SHEATH IMMERSED IN OIL

[75] Inventor: Stanley G. Peschel, Brewster, N.Y.

[73] Assignee: Hipotronics, Inc., Brewster, N.Y.

[22] Filed: Nov. 17, 1972

[21] Appl. No.: 307,571

Related U.S. Application Data
[62] Division of Ser. No. 187,688, Oct. 8, 1971.

[52] U.S. Cl............... 317/99; 174/52 PE; 321/8 R; 338/259; 338/320
[51] Int. Cl.......................... H05k 5/00; H02m 5/00
[58] Field of Search................ 317/99, 101 F, 120; 174/51, 52 R, 52 PE:59; 321/8 R; 338/48, 64, 259, 260, 320

[56] References Cited
UNITED STATES PATENTS

| | | | |
|---|---|---|---|
| 2,466,211 | 4/1949 | Crockett | 338/260 |
| 2,703,853 | 3/1955 | Chrystie | 317/101 F |
| 3,239,751 | 3/1966 | Sibary | 338/64 |
| 3,242,385 | 3/1966 | Steeneck | 317/101 F |
| 3,422,212 | 1/1969 | Clark | 317/99 |
| 3,586,959 | 6/1971 | Eccles | 321/8 |

*Primary Examiner*—Robert K. Schaefer
*Assistant Examiner*—Gerald P. Tolin
*Attorney, Agent, or Firm*—Parmelee, Johnson & Bollinger

[57] ABSTRACT

A high voltage accelerator power supply for providing a substantial current flow at a high D.C. voltage level including a step-up transformer mounted on an upright insulating frame at an intermediate level approximately midway between bottom and top of the power supply with the transformer being horizontally positioned and corona rings encircling the upper and lower edges of its core. One capacitor is below the level of the transformer core and another is above that level in a voltage-doubling arrangement while the core is electrically connected to a junction intermediate the two capacitors to be at an intermediate voltage level. A modular, flexible snake-like electrical device containing a plurality of series-connected rectifier cartridges positioned end-to-end, or similar components, enclosed within a plastic sheath enables connection with substantially uniform voltage stress distribution between a low voltage and a high voltage terminal by conveniently arranging the device in a helical or snake-like path. An isolation transformer system includes first and second widely separated cores one at ground potential and the other at the high D.C. output voltage of the supply, with an endless loop coupling winding at intermediate D.C. level and encased in a heavy insulation covering wound a few turns on each core.

5 Claims, 7 Drawing Figures

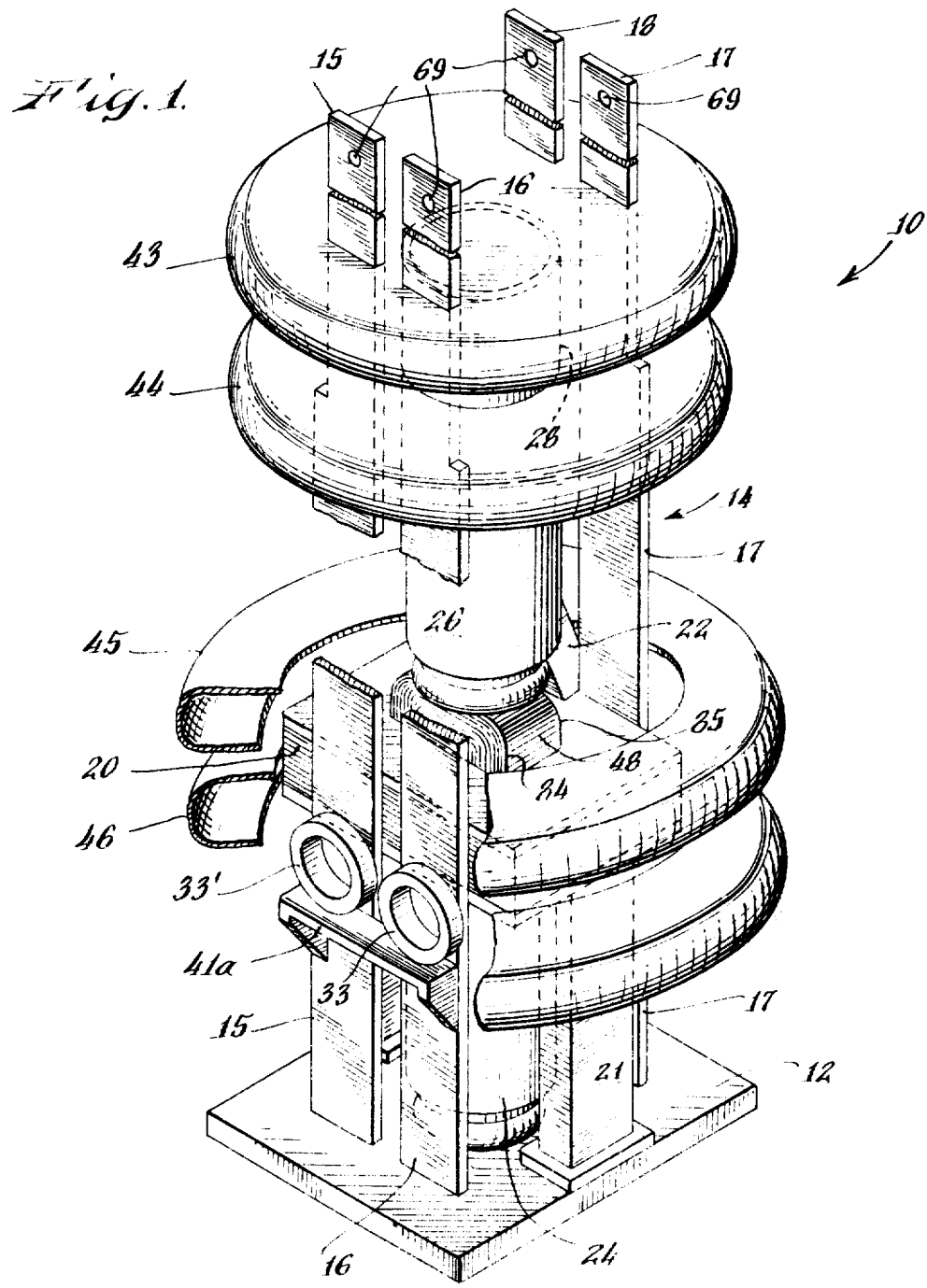

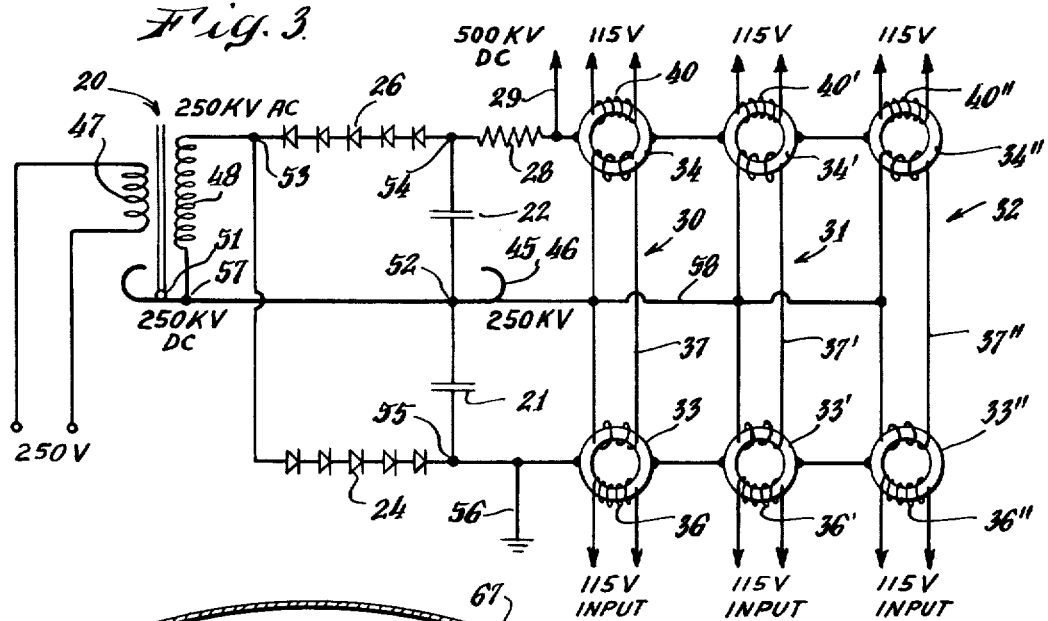
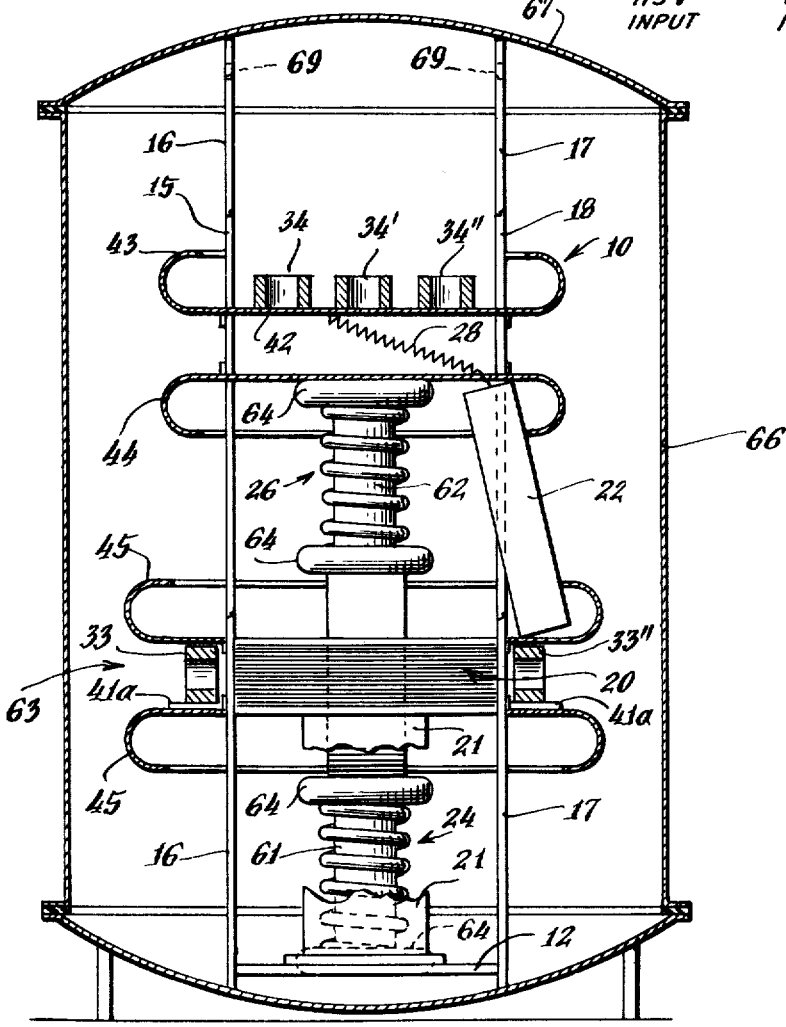

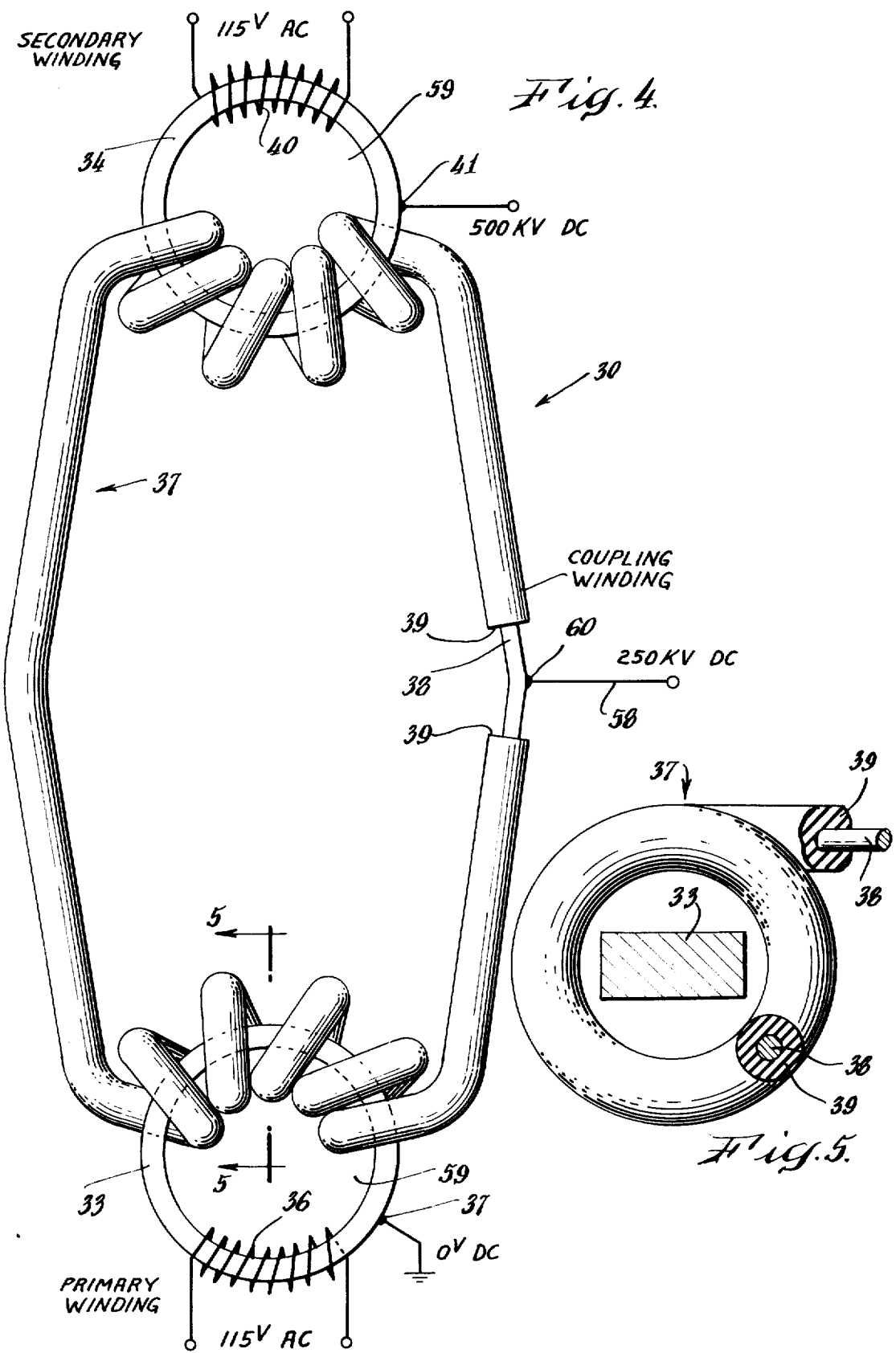

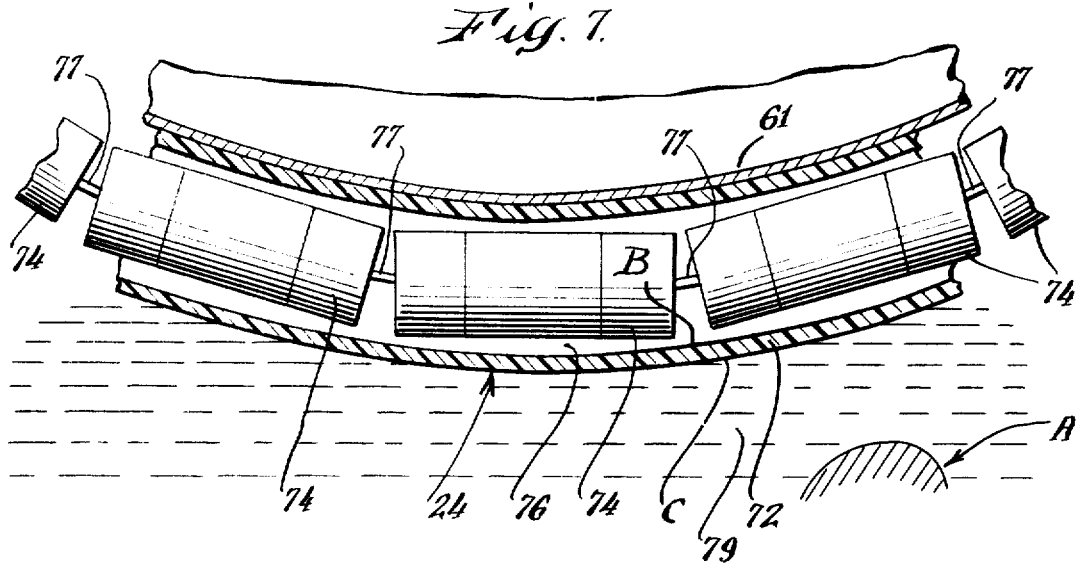
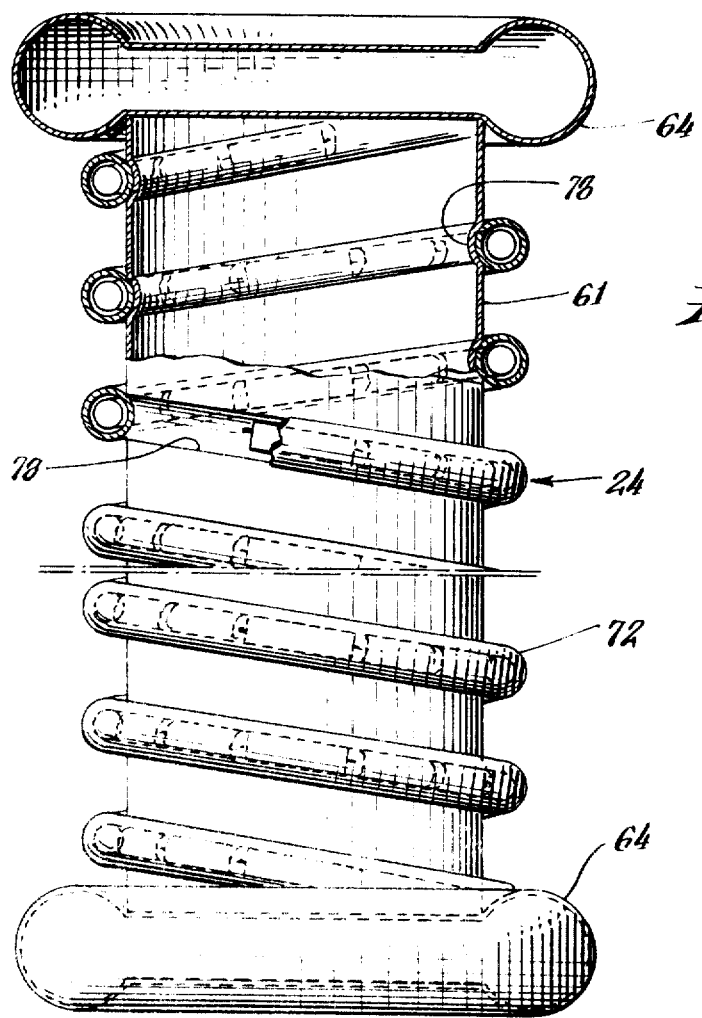

FLEXIBLE SNAKE-LIKE STRING OF COMPONENTS ENCASED IN TUBULAR SHEATH IMMERSED IN OIL

This is a division of application Ser. No. 187,688 filed Oct. 8, 1971.

DESCRIPTION

This invention relates to high voltage electrical power supplies for accelerating a stream of charged particles such as electrons or atomic nuclei to high velocities capable of performing useful work. High voltage power supplies embodying the present invention can be used to power neutron generators for cancer therapy, instantly cure paint surfaces on industrial products such as automobiles, radiate electrical or communication cable to improve its dielectric strength and physical properties, and cause plastic materials such as polyethylene to shrink and conform to the size and shape of a product to be wrapped.

BACKGROUND OF THE INVENTION

High voltage accelerator power supplies prior to the present invention have been unsatisfactory and subject to frequent failure. Such supplies must provide a high voltage, and they must also supply a substantial current flow at this high voltage level, because the stream of particles being accelerated is the direct result of this current flow. If the current flow is small, then the stream of particles is only a trickle and cannot perform the intended work. In the prior art there are high voltage power supplies, but most of these provide only a trickle of current. The dual requirements of (a) high voltage and (b) large current flow, represent antagonistic technological demands which the prior art has not been able to meet. Attempts have been made to use Van der Graff generators as high voltage accelerator power supplies, but such devices are extremely bulky and so expensive to build and difficult to operate that they are not suited to widespread commercial and medical usage.

DETAILED DESCRIPTION

It is among the objects of the present invention to overcome the drawbacks of the prior art and to provide a high voltage accelerator power supply which can provide high voltage and large current flow in a compact, reliable, convenient unit.

A high voltage power supply in accordance with the invention utilizes modular flexible strings of electrical components sheathed by a high voltage flexible dielectric tube immersed in an insulating fluid medium. The dielectric tube sheathed electrical components in conjunction with the surrounding insulating fluid medium avoid voltage stress concentrations, for reasons as will be explained in detail, and may be conveniently adapted to operate with a high voltage power supply.

As described with reference to a high voltage power supply in accordance with the invention a string of electrically series coupled rectifiers embraced by a flexible tube of dielectric material is wrapped in helical fashion about a cylindrical insulator support column for connection to spaced terminals which are at greatly different potential levels. The dielectric sheathed helical string immersed in an insulating fluid medium advantageously avoids voltage stress concentrations at the connection points between the respective individual rectifiers in the string and provides an advantageous convenient flexible rectifier string component for use with high voltage power supplies.

Moreover, advantageously, the polarity of the D.C. output voltage of the power supply can conveiently and easily be reversed by the expedient of removing and inverting these flexible rectifier strings.

A further advantage of the high voltage power supply of this invention resides in an isolation transformer which provides an A.C. power source at an elevated D.C. voltage level, e.g. provides 115v A.C. at a D.C. level of 500,000v relative to ground. The A.C. secondary winding of the isolation transformer power source may be used to heat the filament of a charged particle generator accelerator, such as for an electron beam, while completely isolating the high D.C. voltage level of the secondary from the low D.C. voltage level of the primary winding. The isolation transformer of this invention is preferably formed of a pair of separate cores of magnetically permeable material which are remotely positioned one from the other. One of these two cores is maintained at the high D.C. voltage level of the power supply output, and the other core is maintained at the low D.C. voltage level of the alternating current input to the primary winding. A primary winding having a moderate insulation is wound on the low D.C. voltage core, and a coupling winding having only a few turns with a very high voltage strenth insulation is wound on both cores to couple electrical energy from one magnetically permeable core to the other. The electrical conductor of this few-turn coupling winding is connected at an intermediate point to a D.C. voltage level which is intermediate the D.C. voltage levels of the two cores. A secondary winding which is wound on the high D.C. Voltage level core provides A.C. power referenced to the elevated D.C. voltage thereof. The secondary winding has a moderate insulation similar to the primary winding.

A further advantageous aspect of the present invention is the structural arrangement and assembly of the high voltage accelerator power supply as a whole. The core of the transformer is mounted in a horizontal plane and is located approximately half way between the bottom and top of the power supply. The core is supported on dielectric material, so that it is positioned intermediate the low voltage and high voltage terminals of the power supply. Moreover, the core itself is connected to an intermediate voltage level in the power supply with horizontal corona rings being connected to the core surrounding its upper and lower edges. A first string of series-connected rectifiers surrounded by a flexible tube of high voltage strength plastic material is arranged in a generally helical path extending up around the axis of the power supply from the base up to the level of the transformer. A second similar string of series-connected rectifiers also arranged in a generally helical path extends up around the axis from the level of the transformer to the top of the power supply. The power supply is connected as a voltage doubler network and is assembled with one capacitor being located between the bottom and the level of the transformer and with another being located between the transformer and the top of the assembly.

The various other features, aspects, and advantages of the present invention will become more fully understood from a consideration of the following description of a presently preferred mode of practising the inven-

3 tion considered in conjunction with the accompanying drawings, in which:

FIG. 1 is a perspective view of a high voltage accelerator power supply embodying the present invention, shown removed from its tank and with portions broken away to reveal interior structure;

FIG. 2 is a side view in elevation of the high voltage accelerator power supply of FIG. 1, with portions shown in section;

FIG. 3 is a schematic electrical diagram of the high voltage accelerator power supply of FIGS. 1 and 2;

FIG. 4 is an enlarged illustration of the two-core and coupling winding isolation transformer in accordance with the invention;

FIG. 5 is a sectional view of one of the cores with its coupling winding, the section being taken along the line 5—5 of FIG. 4;

FIG. 6 is a side elevational view shown partially in section of the modular flexible string of electrical components helically mounted around an insulator column support; and FIG. 7 is an enlarged partial sectional view of the modular flexible string of rectifiers surrounded by a flexible tube of dielectric material, as seen in FIG. 6, and shown immersed in an insulating fluid in accordance with the invention.

With reference to FIG. 1, a high voltage accelerator power supply 10 is shown embodying the present invention. The accelerator power supply 10 is particularly useful for delivering electrical power, i.e., substantial current at a high D.C. voltage level to a charged particle accelerator for accelerating a stream of particles used to bombard materials with electrons and the like. The high voltage accelerator power supply 10 is readily adapted to power neutron generators for cancer therapy; it is useful to provide a stream of particles to instantly cure paint surfaces on industrial products, such as automobiles, or to irradiate electrical power or communication cable to improve the dielectric strength and physical properties. Another use is to provide a stream of high velocity particles which cause polyethylene to shrink and conform to the size and shape of an article to be wrapped, and so forth.

The accelerator power supply 10 can provide both the filament heater power and the very high D.C. voltage level and substantial current flow for providing and accelerating the stream of particles. The power supply 10 is vertically oriented being mounted on a stable platform 12 formed of electrical insulating material. A frame 14 formed of dielectric material is supported by platform 12, and this frame 14 includes four upright support columns 15, 16, 17 and 18 arranged in pairs and facing one another, as shown in FIG. 1.

A high voltage step-up transformer having a core 20 is mounted at an intermediate level, approximately half way between the bottom and top of the assembly, being supported by the vertical insulating columns 15, 16, 17 and 18. This transformer provides a voltage step-up from a low A.C. voltage to a high A.C. voltage which appears across the secondary winding of the transformer, as shown in FIG. 3. The core 20 of this transformer is formed of a stack of laminations and is disposed in a horizontal plane. This horizontal disposition of the core is advantageous in providing a generally uniform potential gradient from bottom to top of the power supply, and it enables corona rings to be connected directly to the core in a horizontal plane, sur-

4 rounding the lower and upper edges of the core, if desired. A voltage-doubler network including a pair of series-connected capacitors 21 and 22 is employed, with a pair of modular flexible strings of series-connected rectifiers 24 and 26 which couple the secondary winding of the high voltage transformer to the respective capacitors 21 and 22, as shown in FIG. 3. A modular flexible string of series-connected resistors 28 is employed to feed the high D.C. voltage developed across the capacitors to the output terminal 29, adapted for supplying a load such as the cathode of an electron beam generator and accelerator. This string of resistors 28 provides a surge resistance, i.e., a current-limiting resistance, for preventing a large current surge through the accelerator power supply 10, in the event that an unduly low impedance load is inadvertently connected to the power supply output terminal 29.

A plurality of isolation transformers 30, 31, 32 (FIG. 3) are provided to supply A.C. power to electrical filaments connected to the high voltage side of the power supply 10. As shown in FIG. 4, each isolation transformer 30, 31, or 32 is formed of a pair of widely separated ring cores 33 and 34 of magnetically permeable material. An input primary winding 36 is wound onto the ring core 33 and this primary 36 has terminals adapted to be connected to a source of low-voltage A.C. power, such as 115v A.C. The ring core 33 may be called the primary core, and it is electrically connected to "ground," as indicated at 37. Thus, the core 33 is at zero D.C. voltage level, as shown. By virtue of the fact that there is only a small voltage difference between the primary winding 36 and the primary core 33, the insulation on the primary winding 36 need only be of conventional dielectric strength, such as is normally used for the primary A.C. voltage value.

A coupling winding 37 provided by an electrical conductor 38 surrounded by a thick sheath of strong dielectric material 39 serves to couple the primary ring core 33 with the secondary ring core 34, as shown in FIG. 4. This advantageous relationship will be explained in greater detail later on. The secondary core is connected as indicated at 41 to a source of high D.C. voltage level, shown as being 500,000 volts D.C.

The secondary winding 40 is wound on the secondary core 34. By virtue of the fact that there is only a small voltage difference between the D.C. voltage level of the secondary winding 40 and the secondary core 34, the insulation on the secondary winding 40 need only be of conventional dielectric strength, such as customarily used for the secondary A.C. voltage value. This secondary A.C. voltage, in this example, is the same as the primary A.C. voltage. As shown in FIG. 3, the three isolation transformers 30, 31, and 32 have primary cores 33, 33' and 33'', respectively, and they have secondary cores 34, 34' and 34'', respectively.

As shown in FIG. 1, the primary cores for the isolation transformers 30, 31 and 32 are mounted on the insulating support columns 15, 16, 17, and 18 at an intermediate level. In FIG. 1 only two of the three cores 33, 33' and 33'' can be seen. The cores 33 and 33' are supported by an insulating bracket 41a secured to the columns 15 and 16. The other core 33'' (not seen in FIG. 1) is supported on a similar bracket on the other side secured to the columns 17 and 18.

In FIG. 2 can be seen the three secondary cores 34, 34' and 34'' which are mounted upon a support deck 42 at the top of the power supply within a top toroidal corona ring 43 of metal, such as polished aluminum. Thus, the secondary cores 34, 34' and 34'' are physically widely separated by a substantial distance from the primary cores 33, 33' and 33''. In this case the separation is more than two feet, being more than twice the largest dimension of the individual cores 33, 33', 33'' or 34, 34', 34''.

Corona suppression conductor rings 43, 44, 45 and 46 are provided at appropriate locations around power supply components to obtain an appropriate potential gradient from bottom to top of the accelerator power supply 10. The intermediate corona rings 45 and 46 are physically and electrically connected to the top and bottom of the core 20 of the high voltage step-up transformer. The intermediate corona rings 45 and 46 effectively surround the upper and lower edges and corners of the horizontally positioned transformer core.

FIG. 3 illustrates a schematic electrical circuit diaphragm of the high voltage accelerator power supply 10. A low A.C. input voltage, such as of about 250 volts, is applied across the primary winding 47 of the step-up transformer 20. Its secondary winding 48 provides a turns ratio sufficient to produce a high A.C. voltage output of approximately 1,000 times the primary voltage.

The magnetic core 20 is electrically connected at 51 to a high D.C. electrical voltage which is preferably half way between ground poentital and the high D.C. voltage output level developed by the power supply 10. The two corona rings 45 and 46 are also at this intermediate D.C. voltage level. This intermediate D.C. voltage level is provided for the core 20 by connecting the core to the juncture 52 of the two capacitors 21 and 22.

A pair of modular flexible series-connected rectifier strings 24 and 26 are shown coupled to a common output terminal 53 of the secondary winding 48. The rectifier strings 24 and 26 are shown in FIGS. 6 and 7 as including a multiplicity of individual diodes connected in series, as will be explained in detail later on. The other terminal 57 of the secondary winding 48 is electrically connected to the core 20, and also connected to the juncture 52 between the capacitors 21 and 22.

The rectifier string 26 couples the terminal 53 to the high negative voltage end 54 of the capacitor doubling network 21 and 22. Rectifier string 24 couples terminal 53 to the low voltage end 55, which in this case is at ground potential as shown by the ground connection 56. A modular flexible string of resistors 28 forming a surge resistance couples the high D.C. voltage at 54, developed across capacitors 21 and 22 to the load supply terminal 29. The three isolation transformers 30, 31 and 32 are shown for delivering A.C. power at elevated D.C. voltages. Low voltage A.C. power is supplied to input windings such as 36, 36' and 36'' which are wound around primary magnetic ring cores 33, 33' and 33''. Each primary ring cores is electrically grounded. The coupling windings 37, 37' and 37'' are wound upon both of the respective primary and secondary ring cores. These coupling windings are provided by a heavily insulated conductor 38 (FIG. 4). Output secondary windings, such as 40, 40' and 40'' are wound around the respective ring cores 34, 34' and 34'' which, in turn, are connected at terminal 29 to the high D.C. voltage output level of the power supply. As shown in FIG. 4, the conductor 38 of each coupling winding 37, 37' and 37'' is electrically connected by a connection 58 to the intermediate voltage present on junction 52. As a result, the voltage differences between the coupling conductor 38 (FIG. 4) and any of the ring cores 33, 33' and 33'' is limited to the voltage differential between ground and the intermediate voltage of junction 52, and for the cores 34, 34' and 34'' the differential is equal to that between the high D.C. voltage on terminal 29 and the intermediate voltage on junction 52. It should be understood that the A.C. output windings 40, 40' and 40'' are electrically connected to the high D.C. voltage on terminal 29 at the load, such as the cathode and filament of an electron beam generator accelerator.

The coupling winding 37 has a thick insulation sheath 39 of solid but flexible plastic dielectric material, for example, such as irradiated polyethylene, surrounding a large diameter electrical conductor 38. The insulation sheath may have a thickness of approximately one-half inch, such as that presently commercially available on RG 19U insulated wire, giving a cable having an overall diameter of approximately one inch. As shown in FIG. 5, which is drawn approximately actual size for the illustrative embodiment, the insulation sheath 39 is heavy such that a relatively small number of turns are wound through the respective winding windows 59 of the indentical primary and secondary cores 33 and 34.

It is noted that the coupling winding 37 is formed of a single length of insulated wire such that only a single junction point 60 occurs. This point 60 is physically located approximately midway between the two cores 33 and 34. Thus, there is provided a very long leakage path from the junction point 60 (at 250,000v D.C.) along the surface of the insulation sheath 39 to the primary core 33, at 0v D.C., or to the secondary core 34, at 500,000v D.C. In this advantageous manner, electrical leakage is minimized and so the two cores 33 and 34 can be made compact with relatively small winding windows 59. For example, as shown, the outer diameter of the core is 8 inches and they have an axial length of 2 inches. There is very little voltage stress on the insulation of the windings 36 and 40, as discussed above. Therefore, these windings can be compact.

Referring again to FIG. 2, the advantageous overall construction and assembly of the high voltage accelerator power supply 10 will be explained with greater detail. The rectifier strings 24 and 26 are mounted on cylindrical insulator columns 61 and 62 about which the respective modular flexible string of rectifiers are wound in helical fashion. The vertical axis of the cylinders 61 and 62 and the axis of the helical path of the flexible rectifier strings 24 and 26 coincide with the central vertical axis of the power supply 10. The opposite ends of the helical rectifier strings 24 and 26 are terminated by being connected to corona suppression rings 64 and are electrically connected, as described above with respect to the schematic electrical diagram of FIG. 3. The entire power supply 10 is encased in a metal tank 66 which may be filled with a suitable arc suppressing insulating fluid material, such as transformer oil.

Advantageously, the lower end of the capacitor 21 and the lower end of the rectifier string 24, which are both connected at 55 (FIG. 3) to ground potential, are both physically located down adjacent to the base 12. The capacitor 21 and the rectifier string 24 both extend from the base 12 up to the intermediate D.C. voltage level zone 63 (FIG. 2) which contains the transformer core 20. Also advantageously, the other capacitor 22 and the other rectifier string 26, which extend from the respective intermediate voltage points 52 and 53 (FIG. 3) up to the output voltage point 54, are physically oriented in the same relationship. That is, the lower end of the capacitor 22 and the lower end of the rectifier string 26 are located near the intermediate D.C. voltage level zone 63, while they both extend upwardly with their upper ends being located near the output voltage corona ring 44.

As a result of these relationships, the voltage gradients occurring along the rectifier strings 24 and 26 and that occurring along the capacitors 21 and 22 correspond closely with the voltage gradients occurring from top to bottom along the height of the power supply 10.

In order to provide for conveniently removing the entire power supply 10 from the tank 66 when the cover 67 is removed, the four insulating columns 15, 16, 17 and 18 extend up to a position just beneath the removable cover 67. The upper ends of these columns have holes 69 (FIGS. 1 and 2) drilled through them to provide attachment points for securing the lifting means of a crane thereto. In this way, the entire power supply 10 can be lifted out of the tank 66 while conveniently allowing the dielectric oil to remain in the tank, instead of draining it from the tank, such draining being required in most prior art devices.

FIGS. 6 and 7 show a modular flexible string of rectifiers such as 24 with enlarged cartridges A long flexible tube housing 72 of high voltage stress resistant material, such as polyethylene tubing, is shown enclosing the serially connected rectifiers such as 74. These rectifiers 74 are located in the bore 76 of the dielectric tubing 72. It is noted that the rectifiers 74 are in the form of relatively small modules, e.g. small length cartridges arranged in end-to-end relationship within the bore 76. Their flexible terminal leads 77 are located at opposite ends of the cartridges. These leads 77 are cut to short length and they are interconnected such that the ends of the successive cartridge are closely adjacent one to another, as shown in FIG. 7. The individual rectifier modules 74 can be made of any rectifier material. In other words, any modular type rectifiers can be used. For example, in this embodiment the rectifiers are made of selenium.

The flexible tubular dielectric housing 72 provides mechanical support for the individual rectifier modules 74 as well as providing insulation between successive turns of the rectifier string 24. Another function provided by the tubular dielectric housing 72 is continuous voltage stress relief along the entire length of the rectifier string 24. The flexible rectifier string 24 is supported upon an insulation support column 61 having a corrugated cylindrical configuration by winding the rectifier string helically around the support. This support 61 can be made of any insulation material having sufficient dielectric strength. For example, the support 61 in this embodiment is made of methyl methacrylate, e.g. "Lucite," "Plexiglass." At opposite ends of the support columns 61 are corona suppression rings 64 of conductive material.

As mentioned above, the tubular dielectric housing 72 advantageously provides continuous voltage stress relief along the entire length of the rectifier string. This can be explained by observing FIG. 7. For example, assume that a conductive object is located at region A in the insulating transformer oil 79. Then, the voltage distribution between the object A and the region B within the tubular sheath 72 near the interconnected terminals 77 is a direct function of the relative thicknesses of the two materials 72 and 79, and an inverse function of the dielectric constants of the respective materials 72 and 79, which are in series relationship between A and B.

Thus, by utilizing a plastic sheath 72 which has a lower dielectric constant than the oil, a greater proportional voltage gradient (stress) is applied to the plastic sheath than to the oil. For example, the dielectric constant of the transformer oil 79 is appoximately two, whereas the dielectric constant of the plastic sheath 72 is approximately one, so that the voltage gradient (stress) across the plastic sheath is twice that across the oil. However, the dielectric strength of the plastic sheath is several times greater than the dielectric strength of the oil, so that the plastic sheath 72 can readily withstand the double stress.

As a result of the increased voltage stress across the sheath from B to C, the voltage stress in the oil from A to the point C on the exterior of the sheath 72 is correspondingly reduced. In this way, the oil is protected from electrical breakdown. Moreover, the result is to create a substantially uniform voltage stress along the exterior surface of the tubular housing 72.

The flexible rectifier string can be arranged in many different configurations. The helical configuration, as shown, with the rectifier string nested in a helical groove 78 in the cylinder 61 is a convenient arrangement for this embodiment, but other arrangements such as a series of snakelike-S-curves can be used. The important point is that this flexible rectifier string is a novel electrical component which is convenient to use and is adapted to be used in many different high voltage rectifier applications.

The surge resistor 28 may conveniently be formed by a plurality of resistor cartridges series connected end to end and encased in a plastic sheath similar to that shown in FIG. 7.

I claim:

1. A flexible snake-like string for electrically coupling a high voltage terminal with a low voltage terminal comprising a long flexible tubular sheath of high voltage stress resistant plastic having a long tubular bore, a multiplicity of cylindrical electrical cartridge components all of the same size positioned within the bore of said sheath in end-to-end relationship with the ends of successive cartridge components positioned closely adjacent to one another, the ends of successive cartridge components in said bore being flexibly electrically connected for interconnecting all of the cartridge components in series electrical relationship within said long tubular bore while permitting flexing of said tubular sheath, the diameter of said cartridge components being substantially equal to the internal diameter of said bore, and said tubular sheath containing said series-connected cartridge components being immersed in transformer oil, and said tubular sheath having a lower dielectric constant than said transformer oil but having a higher dielectric strength than said transformer oil, whereby an increased voltage gradient appears across said plastic sheath as compared to said transformer oil, thereby reducing the voltage stress in the transformer oil for protecting the oil from electrical breakdown.

2. A flexible snake-like string for electrically coupling a high voltage terminal with a low voltage terminal as claimed in claim 1, in which:

the dielectric constant of the transformer oil is approximately two and the dielectric constant of the flexible plastic sheath is approximately one so that the voltage gradient across the plastic sheath is approximately twice that across the oil.

3. A flexible snake-like string for electrically coupling a high voltage terminal with a low voltage terminal as claimed in claim 1, in which:

said cartridge components have flexible terminal leads located at opposite ends of the respective cartridge components, and said leads are cut to short length and the leads on the ends of successive cartridge components are interconnected such that the ends of the successive cartridge components are closely adjacent one to another.

4. A flexible, snake-like string for electrically coupling a high voltage terminal with a low voltage terminal as claimed in claim 1, in which:

said tubular sheath containing said series-connected end-to-end cartridge components is helically wound around and supported upon an insulating column having a cylindrical configuration with corona suppression rings of electrically conductive material surrounding opposite ends of said column, and the opposite ends of said string are respectively electrically connected to said corona suppression rings.

5. A flexible, snake-like rectifier string for electrically coupling a high voltage terminal with a low voltage terminal comprising a long flexible tubular sheath of high voltage stress resistant plastic having a long tubular bore, a multiplicity of cylindrical electrical cartridge rectifiers all of the same size positioned within the bore of said sheath in end-to-end relationship with the ends of successive rectifiers being positioned closely adjacent one to another, the ends of successive rectifiers in said bore being flexibly electrically connected for interconnecting all of the rectifiers in series electrical relationship within said long tubular bore while permitting flexing of said tubular sheath, the diameter of said rectifiers being substantially equal to the internal diameter of said bore, and said tubular sheath containing said series-connected rectifiers being immersed in transformer oil, and said tubular sheath having a lower dielectric constant than said transformer oil but having a higher dielectric strength than said transformer oil, whereby an increased voltage gradient appears across said plastic sheath as compared to said transformer oil, thereby reducing the voltage stress in the transformer oil for providing continuous voltage stress relief along the entire length of said string.

* * * * *